June 27, 1967 C. P. HEDGES 3,327,666
SUMMING STRUCTURE FOR SPATIALLY DISTRIBUTED FORCES
Filed Sept. 10, 1964 3 Sheets-Sheet 1
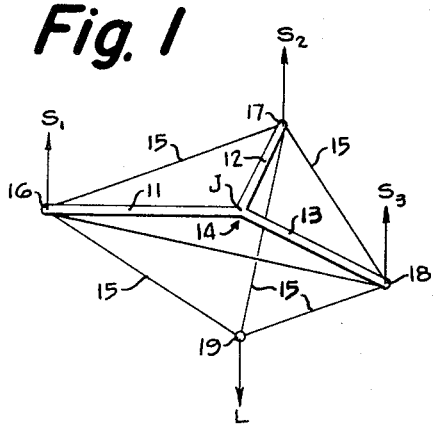
Fig. 1
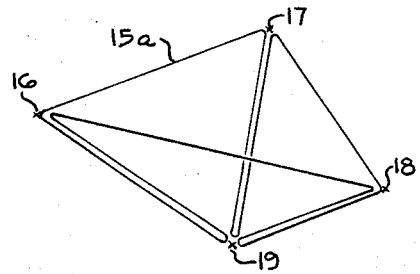
Fig. 1a
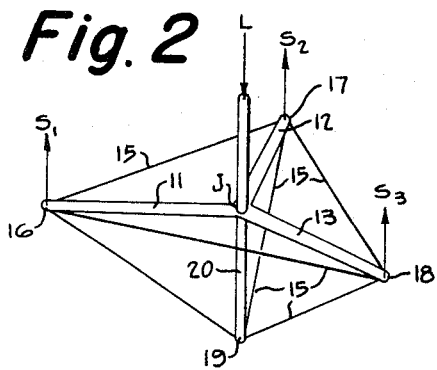
Fig. 2
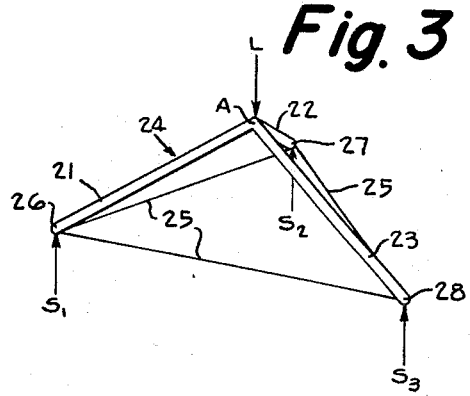
Fig. 3
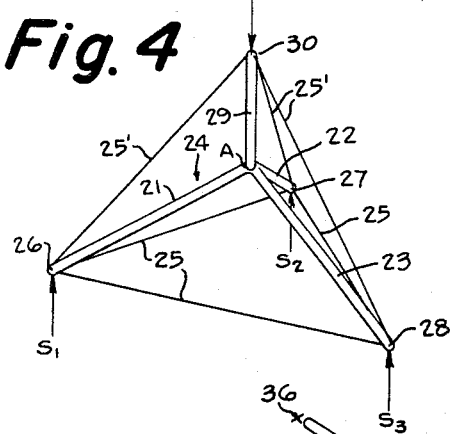
Fig. 4
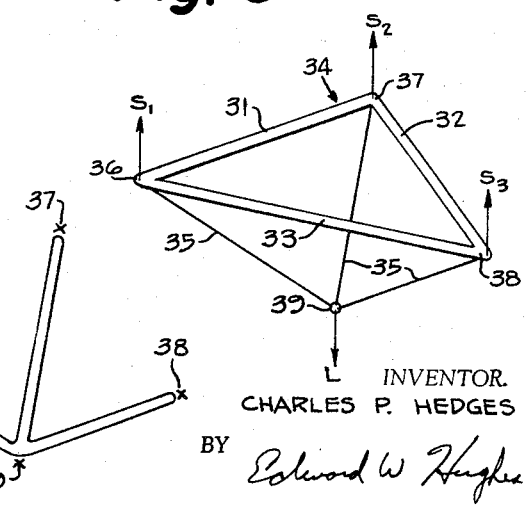
Fig. 5
Fig. 5a
INVENTOR.
CHARLES P. HEDGES
BY Edward W. Hughes
ATTORNEY June 27, 1967  C. P. HEDGES  3,327,666
SUMMING STRUCTURE FOR SPATIALLY DISTRIBUTED FORCES
Filed Sept. 10, 1964  3 Sheets-Sheet 2

INVENTOR.
CHARLES P. HEDGES
BY Edward W. Hughes
ATTORNEY

June 27, 1967 C. P. HEDGES 3,327,666
SUMMING STRUCTURE FOR SPATIALLY DISTRIBUTED FORCES
Filed Sept. 10, 1964 3 Sheets-Sheet 3

INVENTOR.
CHARLES P. HEDGES
BY Edward W. Hughes
ATTORNEY

United States Patent Office 3,327,666
Patented June 27, 1967

3,327,666
SUMMING STRUCTURE FOR SPATIALLY
DISTRIBUTED FORCES
Charles P. Hedges, Santa Barbara, Calif., assignor to
General Electric Company, a corporation of New York
Filed Sept. 10, 1964, Ser. No. 395,490
2 Claims. (Cl. 114—.5)

ABSTRACT OF THE DISCLOSURE

Tetrahedron formed of struts and cables is used as bridle to provide comparatively stable support for single load carried by three less stable supports; may be collapsible for easy towing.

This invention relates to a summing structure and, more particularly, to a summing structure for intercoupling and balancing a plurality of forces applied to it at a plurality of non-coplanar points.

In aeronautical and marine technology, it is frequently necessary to provide a force intercoupler between a load and the spatially distributed means for applying supporting forces to the load. Turbulent conditions in aeronautical and marine environments tend to militate against attempts to produce steady supporting forces, particularly when the supporting forces are derived from buoyant members within the fluid medium. In turbulent gaseous and liquid environments, it is possible to reduce rotation of the force intercoupler by spatially distributing the coupling points to which the supporting forces are applied. Also, there is a need for a force intercoupler which automatically sums a plurality of fluctuating supporting forces to achieve dynamic equilibrium and produce a single, less variable force for application to a load. In this respect, it is imperative that the summing structure have static equilibrium and continue to function as a coupler upon failure of one or more of a plurality of supporting forces by automatically adjusting itself to the new static conditions.

This invention discloses a low cost structure for summing forces which are relatively widely distributed in space.

Accordingly, an object of this invention is to provide a summing structure for intercoupling a plurality of non-coplanar, spatially distributed supporting forces and a load force.

Another object is to provide a summing structure which automatically provides dynamic equilibrium between a plurality of fluctuating supporting forces applied through it to a load force.

A further object is to provide a summing structure which automatically re-establishes static equilibrium upon failure of one or more of a plurality of supporting forces.

Further objects and advantages will become apparent as the following description proceeds and the features of novelty are pointed out with particularity in the claims annexed to and forming part of this specification.

In carrying out this invention in one form thereof, structural means are employed, which include a plurality of axially loaded structural members, to form a tetrahedral-shaped framework. Three members are rigid and capable of sustaining both compressive and tensive loads. The remaining members are flexible, lightweight cables which sustain only tensive loads. The three rigid members are fixedly attached to form a three-pointed rigid base structure which forms the base of the tetrahedral framework. The three-pointed structure may consist of an equilateral triangle, or an equiangular star-shaped structure wherein one end of each of the three members is attached at a single joint. Tension-sustaining members are strung between the free ends of the latter structure to prevent relative angular rotation between the rigid members. Tension-sustaining members are also attached to the three points of the rigid base structure and meet at a common coupling displaced from the base structure, thus forming the apex of the tetrahedral framework. The tetrahedral framework is suspended in unrestrained position, with a load force attached to the apex, by parallel but oppositely directed supporting forces which are applied to the three corners of the rigid base structure. If one or more of the supporting forces fluctuates, the unrestrained tetrahedral framework automatically shifts to compensate for the fluctuating forces by continuously changing the moment arm of each supporting force about the apex where the load force is attached. If one or more of the supporting forces fails, the unrestrained structure rotates to redistribute the load force between the remaining supporting forces.

The supporting forces of a primary summing structure may be represented by the load forces applied to similar secondray summing structures where compounding of individual summing structures is desired. Each supporting force of the primary summing structure may be thereby subdivided into three secondary supporting forces.

For a better understanding of the invention, reference is made to the accompanying drawings in which:

FIGURE 1 illustrates one embodiment of the summing structure wherein the rigid base members are arranged in a coplanar star-shaped pattern;

FIGURE 1a illustrates an arrangement for the tension-sustaining members in the summing structure as illustrated in FIGURE 1;

FIGURE 2 illustrates the star-shaped summing structure of FIGURE 1 with the addition of a rigid load-attaching member;

FIGURE 3 illustrates a summing structure wherein the rigid base members are arranged in a pyramidal-shaped pattern;

FIGURE 4 illustrates the pyramidal-shaped summing structure of FIGURE 3 with the addition of a rigid load-attaching member;

FIGURE 5 illustrates a summing structure wherein the rigid base members form a rigid triangle;

FIGURE 5a illustrates an arrangement for the tension-sustaining members in the summing structure of FIGURE 5;

Figure 6:
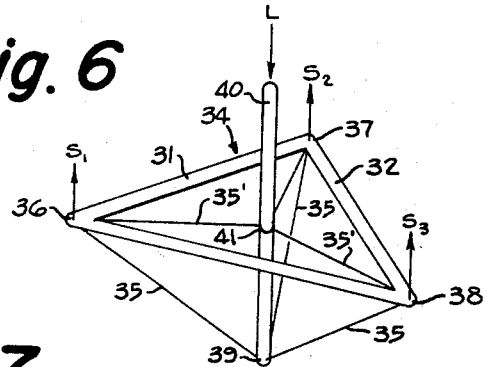
FIGURE 6 illustrates the triangularly-shaped summing structure of FIGURE 5 with the addition of a rigid load-attaching member.

Referring to FIGURE 1, a summing structure is disclosed wherein three equilength rigid base members 11, 12 and 13 are equiangularly disposed with one end of each member fixedly secured at a common joint J to form a star-shaped coplanar base structure 14. Tension-sustaining means in the form of flexible cable strands 15 are secured to and arranged in tension between the free ends 16, 17, and 18 of the star-shaped base structure 14. The tension-sustaining means 15 also extend from the free ends 16, 17, and 18 to a coupling 19 located below the plane of the base structure 14. A load force L may be supported below the base structure 14 by attaching the load force L to the coupling 19, the direction of the load force L being downwardly along a vertical line which passes through the coupling 19.

In order to support or lift the load force L, supporting forces $S_1$, $S_2$, and $S_3$ are applied to the free ends 16, 17, and 18, respectively, of the star-shaped base structure 14 through suitable couplings and cables. Supporting forces are applied to the cables and, in this manner, the structure is supported unrestrained in that the structure readily shifts to redistribute the load upon failure of a supporting force. The supporting forces $S_1$, $S_2$, and $S_3$ are preferably directed vertically upwardly, that is, directed parallel but oppositely to the load force L. The tension-sustaining flexible cable strands 15 may be comprised of a single closed-loop cable 15a, as arranged in FIGURE 1a. The closed-loop cable 15a is arranged between each free end 16, 17, and 18 and the coupling 19, and also between the individual free ends 16, 17, and 18 of the base structure 14. In order to more clearly visualize the position of the base structure and coupling relative to the closed-loop arrangement of FIGURE 1a, the positions of the free ends of the base structure and the coupling are indicated by an X in addition to the respective numerical designation as appears in FIGURE 1. This convenient designation is also applied to FIGURE 5a which indicates another embodiment of the closed-loop cable arrangement.

The summing structure as illustrated in FIGURE 1 may also be used to support a load force above the base structure 14 by attaching one end of a vertically disposed rigid member 20 to the coupling 19 and by attaching the portion of the rigid member intermediate the two ends to the joint J as illustrated in FIGURE 2. Although the arrangement in FIGURE 2 shows the joint J attached to the center portion of the rigid member 20, the attachment may be at any point intermediate the ends. The load force L may then be applied substantially downwardly on the top end of the rigid member 20 as shown, or at any other point of member 20.

A second embodiment of the summing structure is disclosed in FIGURE 3 employing a pyramidal-shaped base structure 24. Three equilength rigid members 21, 22, and 23 are equiangularly disposed with one end of each member secured to form an apex A of the pyramidal-shaped base structure. Tension-sustaining flexible cable strands 25 are secured to and arranged in tension between the free ends 26, 27, and 28 of the rigid members 21, 22, and 23, respectively. A load force L is applied downwardly at the apex A as indicated in FIGURE 3. To support the load force L above the apex A, an additional rigid member 29 is secured at the apex A and oriented vertically upwardly as indicated in FIGURE 4. Additional tension-sustaining flexible cable strands 25' are attached between the free ends 26, 27, and 28 of the rigid members 21, 22, 23 and the free end 30 for supporting the vertically disposed rigid member 29. The load force L may then be applied to the free end 30 of the rigid member 29.

In order to support or lift the load force L, supporting forces $S_1$, $S_2$, and $S_3$ are applied to the free ends 26, 27 and 28 of the base structure 24 through suitable couplings and cables. The supporting forces, applied to the base structure in this manner, suspend the structure unrestrained so that the structure can reorient itself to redistribute the load upon failure of a supporting force. Preferably, the supporting forces $S_1$, $S_2$, and $S_3$ are directed vertically upwardly, that is, directed parallel but oppositely to the load force L.

A third embodiment of the summing structure is illustrated in FIGURE 5 wherein a triangularly-shaped base structure 34 is employed. Three equilength rigid members 31, 32, and 33 are fixedly secured to form the rigid triangularly-shaped base structure 34. Three tension-sustaining flexible cable strands 35 are secured to the corner 36, 37, and 38 of the base structure 34 and are connected to a coupling 39 to which a load force L is attached. The coupling 39 is disposed vertically below the plane of the triangularly-shaped base structure 34.

To support the load force L above the base structure 34 as indicated in FIGURE 6, a fourth rigid member 40 is mounted with one end secured to the coupling 39 and a portion intermediate the ends secured to a coupling 41 secured to corners 36, 37, 38 by cables 35'. The load force L may then be applied to the end of rigid member 40.

In order to resist or lift the load force L, supporting forces $S_1$, $S_2$, and $S_3$ are applied to the corners 36, 37, and 38, respectively, of the triangularly-shaped base structure 34 through suitable couplings and cables. The supporting forces suspend the structure unrestrained in that the structure may reorient itself to redistribute the load upon failure of a supporting force. Preferably, the supporting forces $S_1$, $S_2$, and $S_3$ are directed vertically upwardly; that is, directed parallel but oppositely relative to the load force L. The tension-sustaining flexible cable strands 35 may be comprised of a single closed-loop cable 35a as arranged in FIGURE 5a. The closed-loop cable 35a is arranged between the corners 36, 37, and 38 of the base structure 34 and the coupling 39.

Having described various suggested embodiments of a summing structure as envisioned by this invention, the particular advantages of the unique structure for intercoupling and balancing a plurality of forces applied to it at a plurality of non-coplanar points can be readily appreciated. If the center of mass is beneath the three points to which the supporting forces are attached and if one or more of the supporting forces $S_1$, $S_2$, or $S_3$ fluctuates, the unrestrained summing structure shifts to compensate for the fluctuating force by continuously changing the moment arm of each supporting force about the center of mass to provide dynamic equilibrium. Also, if one or more of the supporting forces fails, the summing structure, which is suspended unrestrained between the supporting forces and the load, rotates to redistribute the load between the remaining supporting forces to provide static equilibrium.

Figure 7:
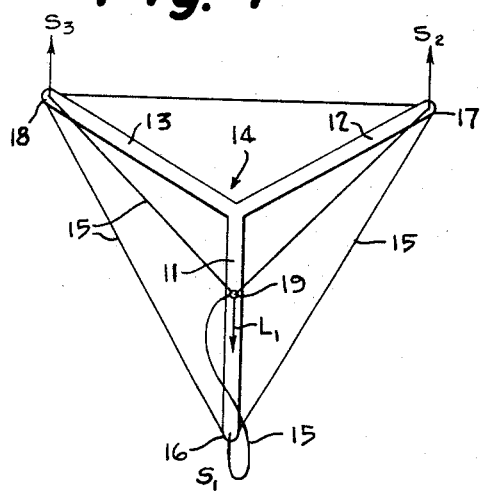
FIGURE 7 illustrates the summing structure of FIGURE 1 after one supporting force has failed.
Figure 8:
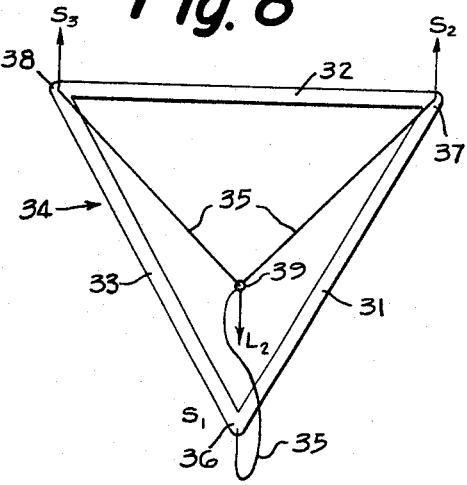
FIGURE 8 illustrates the summing structure of FIGURE 5 after one supporting force has failed.

FIGURES 7 and 8 illustrate the summing structures of FIGURES 1 and 5, respectively, after the supporting force $S_1$ has failed. In each example, the base structure has reoriented itself to redistribute the load L between the remaining supporting forces $S_2$ and $S_3$, thereby insuring rotational equilibrium when the center of mass and the points at which the supporting forces are applied lie in a vertical plane.

The summing structures of FIGURES 1 and 5 are particularly useful for summing tensive forces, that is to say, when the supporting forces are directed away from the load force. The summing structures of FIGURES 2, 3, and 6 are particularly useful for summing compressive forces; that is to say, when the supporting forces are directed toward the load force. The summing structure of FIGURE 4 is useful under either compressive or tensive conditions.

Figure 9:
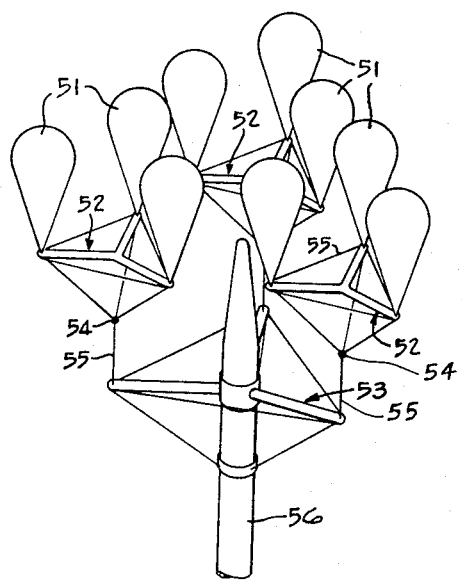
FIGURE 9 illustrates one application, in a gaseous environment, of summing structures as disclosed in FIGURE 1.

To appreciate particular applications of the summing structures, reference is made to FIGURES 9, 10, 11, and 12. FIGURE 9 discloses a plurality of buoyant members 51 which provide supporting forces to three secondary star-shaped summing structures 52 of the type shown in FIGURE 1. The secondary summing structures 52, in turn, provide the supporting forces for a primary star-shaped summing structure 53 through suitable couplings 54 and cables 55. The load, in this case, is a rocket 56 which is being lifted to high altitude before its motor is ignited. It can readily be appreciated that in the event that one of more of the buoyant members 51 fails, the corresponding secondary summing structure 52 will reorient itself to redistribute the supporting force between the remaining buoyant members to provide rotational static equilibrium. Additionally, because of normal turbulent atmospheric conditions, the supporting force provided by each buoyant member 51 will obviously fluctuate. Due to the ability of the summing structures to continuously reorient their positions to compensate for fluctuations in the individual supporting forces, dynamic equilibrium is preserved and a substantially steady force is applied to the load.

Figure 10:
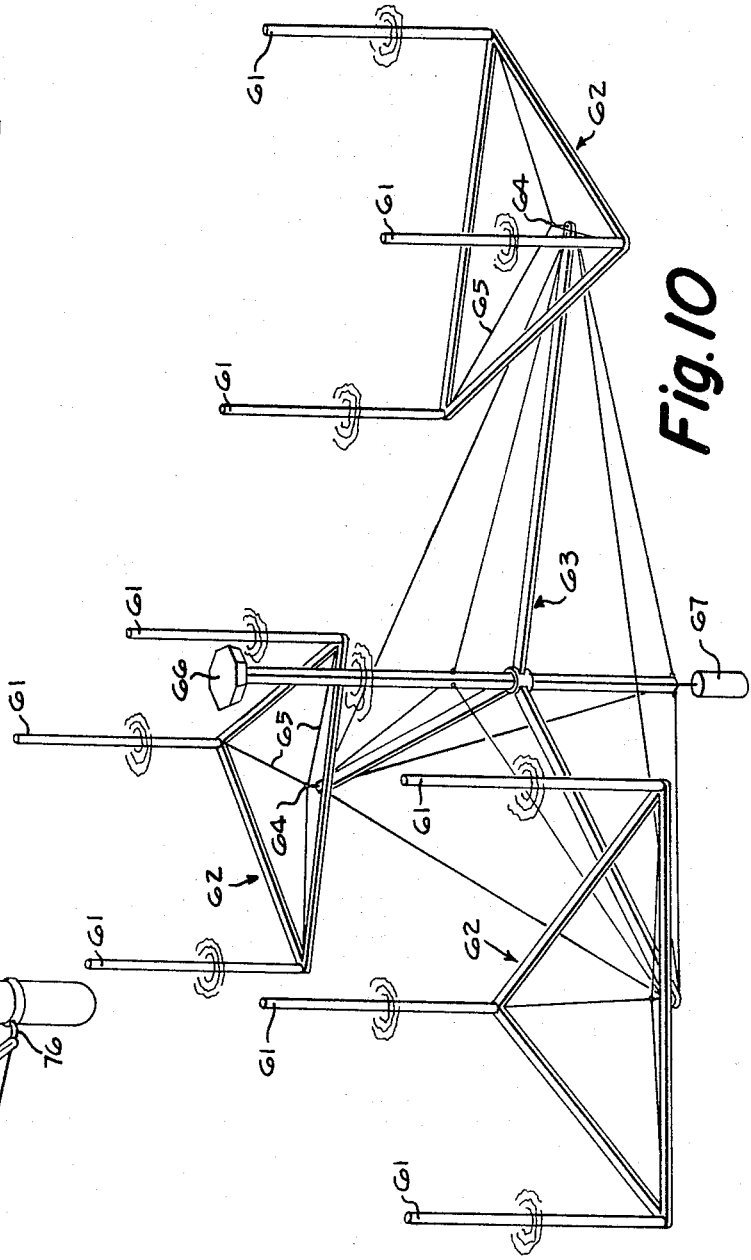
FIGURE 10 illustrates an application of the summing structures of FIGURES 1 and 5 in a liquid environment.

The dynamic and static stability aspect can also be appreciated by referring to the floating marine platform as disclosed in FIGURE 10. Float members 61 provide supporting forces to three triangularly-shaped secondary summing structures 62 of the type shown in FIGURE 5. The secondary summing structures 62 provide, in turn, the supporting forces for a primary summing structure 63 through suitable couplings 64 and cables 65. The primary summing structure 63 supports a platform 66, which is maintained above the water level, and a load 67 which is carried below the primary summing structure 63 in order to keep a low center of mass. Due to the constant wave disturbance, the lifting force of the individual floats 61 continuously fluctuates. However, dynamic equilibrium is preserved since the triangularly-shaped summing structures 62 are capable of integrating the fluctuating supporting forces of the floats 61 to provide a substantially steady supporting force which is applied to the three points of the primary summing structure 63. In this manner the platform 66 is supported with negligible fluctuations in position despite substantial wave motion.

Figure 11:
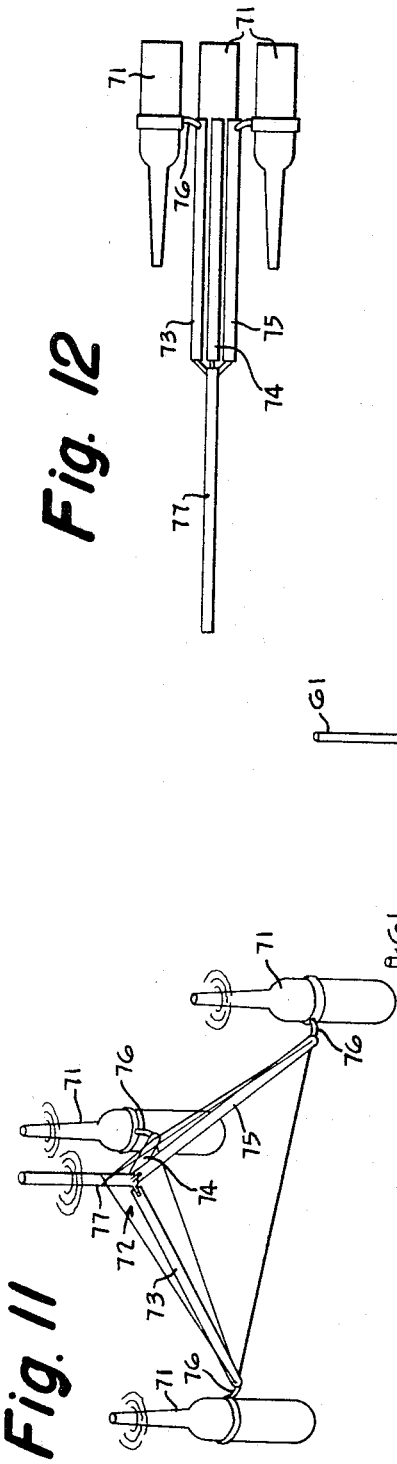
FIGURE 11 illustrates a summing structure similar to the structure of FIGURE 3 while supported by buoys.

The summing structure illustrated in FIGURE 11 is similar to the structure as illustrated in FIGURE 4. The bottle-shaped floats 71 for the summing structure 72 of FIGURE 11 are attached to the three radial arms 73, 74, and 75 by gimbals 76 which are offset and which allow the floats to pivot universally without torquing the summing structure in the direction of pivot. Floats 71 are bottle-shaped to increase their natural period in the vertical direction or heave as compared with the natural period of can buoys of equal displacement. Bottle-shaped floats also have the advantage over can-shaped buoys in that the increased radius of the bulbous portion of these floats produces the same displacement with a shorter float length. It is important that the center of buoyancy of floats 71 be above the gimbal axis or point at which the floats are coupled to the float.

Figure 12:
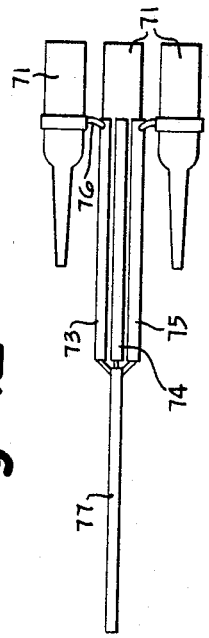
FIGURE 12 illustrates the summing structure of FIGURE 11 while in a folded position to facilitate towing.

The radial arms 73, 74, and 75 are pivoted to a mast 77 so that the arms may be folded and become essentially parallel with the mast for easy towing in a liquid medium as indicated in FIGURE 12. When the arms are so positioned, the gimbals 76 allow the floats 71 to align themselves parallel to the folded radial arms to form a compact arrangement which decreases the fluid resistance during towing.

From the foregoing discussion, it will be apparent that the summing structure of this invention provides a steady resultant force for application to a load by automatically integrating a plurality of individual fluctuating supporting forces to achieve dynamic equilibrium, and by automatically redistributing static forces to maintain a resultant supporting force in the event of individual supporting force failure.

While several specific embodiments of this invention have been shown and described, it is not intended that the invention be limited to the particular structures shown and described and it is intended by the appended claims to cover all modifications within the spirit and scope of this invention.

What I claim as new and desire to secure by Letters Patent of the United States is:

1. In a summing structure for intercoupling and balancing a plurality of forces applied to it at a plurality of non-coplanar points:
   (a) three equilength compression-sustaining rigid members equiangularly disposed about a common connection to form a rigid three-pointed base structure,
   (b) first tension-sustaining means secured to said base structure at the three points thereof for preventing relative angular movement of said rigid members,
   (c) second tension-sustaining means secured to said base structure at the three points thereof and to a coupling displaced from said base structure,
   (d) a loading attaching means secured to said coupling for applying a load force to said base structure in one direction, and
   (e) suspension means attached to said base structure at the three points thereof for suspending said base structure and for applying supporting forces to each of said points in a direction substantially parallel to and directed oppositely to the load force, said suspension means comprising a plurality of secondary summing structures, each of said secondary summing structures comprising:
      (i) a coupling attached to said base structure at the free end of said three rigid members,
      (ii) third tension-sustaining means secured to said coupling, and
      (iii) three equilength secondary rigid members equiangularly disposed about a common connection to form a rigid three-pointed secondary base structure, said third tension-sustaining means being secured to said secondary base structure at the three points thereof,
      (iv) fourth tension-sustaining means secured to said secondary base structure between the three points thereof for preventing relative angular movement of said secondary rigid members, and
      (v) buoyant means adapted to float at the surface of a body of liquid, secured to said secondary base structure at the three points thereof for providing supporting forces to each of said points of said secondary summing structure for supporting said secondary summing structure when disposed in the said body of liquid.

2. In a summing structure for intercoupling and balancing a plurality of forces applied to it at a plurality of non-coplanar points:
   (a) first, second, and third equilength compression-sustaining rigid members equiangularly disposed in non-coplanar arrangement about a common connection which forms the apex of a rigid pyramidal-shaped base structure.
   (b) tension-sustaining means secured to said base structure at the free ends of said first, second, and third rigid members and extending therebetween for preventing relative angular movement of said rigid members,
   (c) a load attaching means for applying a load force to said base structure at said apex of said base structure, comprising a fourth compression-sustaining rigid member having one end secured at said apex, said fourth rigid member being equiangularly disposed relative to said first, second, and third rigid members, and second tension-sustaining means secured to and extending between the free end of each of said first, second, and third rigid members and the free end of said fourth rigid member for supporting said fourth rigid member relative to said base structure, the load force being applied to the free end of said fourth rigid member in a direction substantially axially thereto;
   (d) suspension means attached to said base structure at said free ends of said first, second, and third rigid members for suspending said base structure and for applying supporting forces to each of said free ends in a direction substantially parallel to and directed oppositely to the load force, comprising a plurality of float members, each of said float members being attached to a corresponding free end of said rigid member by a gimbal means whereby said float member may pivot relative to said rigid member, and said first, second, and third rigid members being pivotally attached to said fourth rigid member whereby said floats may be folded parallel to said first, second, and third rigid members and said first, second, and third rigid members may be folded parallel to said fourth rigid member to facilitate towing of said structure through a liquid medium.

References Cited

UNITED STATES PATENTS

| | | | | |
|---|---|---|---|---|
| 605,438 | 6/1898 | Koehler | | 244—31 |
| 819,576 | 5/1906 | McCabe | | 294—81 X |
| 2,450,417 | 10/1948 | Bossi | | 9—8 |
| 2,721,044 | 10/1955 | Young | | 244—2 |
| 2,730,398 | 1/1956 | Huested | | 294—81 |
| 3,008,665 | 11/1961 | Piasecki | | 244—2 |
| 3,011,467 | 12/1961 | Le Tourneau. | | |
| 3,044,818 | 7/1962 | Tobey | | 244—118 X |
| 3,159,130 | 12/1964 | Vos. | | |

MILTON BUCHLER, *Primary Examiner.*

T. MAJOR, *Assistant Examiner.*